April 16, 1935.　　　F. H. SANDHERR　　　1,997,835
TRACTOR WHEEL
Filed Nov. 20, 1933
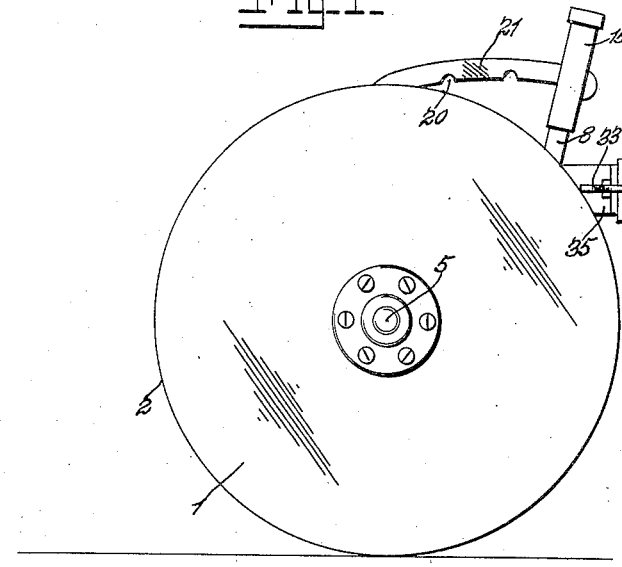
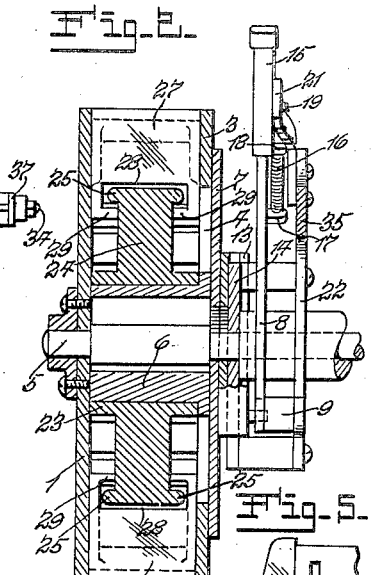
Inventor
Frederick H. Sandherr
by Ramsey & Kingsland
His Attorneys Patented Apr. 16, 1935

1,997,835

UNITED STATES PATENT OFFICE 1,997,835

TRACTOR WHEEL

Frederick H. Sandherr, Richmond Heights, Mo.

Application November 20, 1933, Serial No. 698,805

6 Claims. (Cl. 301—48)

This invention relates to tractor wheels, and has special reference to tractor wheels equipped with a number of elements functioning as cleats or lugs when cleats or lugs are needed and with mechanism for retracting and drawing said elements into the wheels so as to provide smooth peripheries that will not be damaging to roadways.

An object of the invention is to provide an improved tractor wheel having a smooth peripheral surface with openings through the rim of the wheel, in combination with a series of elements supported within the rim of the wheel for inward and outward movement through said openings to function as cleats or lugs, and mechanism within the wheel for moving said elements inwardly and outwardly through said openings so that said elements will be positioned to function as cleats or lugs automatically and as an incident to the turning of the wheel or for supporting said elements in unoperated position within the wheel, as desired. These elements may be controlled to function as cleats or lugs whenever needed for that purpose or they may be supported entirely within the wheel so as to leave the wheel with a smooth unobstructed peripheral tread surface that may roll along paved highways or streets or the like without causing damage.

Another object of the invention is to provide an improved tractor wheel possessing the advantageous features of construction hereinafter described, reference being made to the annexed drawing, in which—

Fig. 1 is an outer side elevation of my improved tractor wheel.

Fig. 2 is a vertical sectional view parallel with the axis of the wheel.

Fig. 3 is a vertical sectional view transversely of the axis of the wheel.

Fig. 4 is an inner side elevation of the wheel showing the operating mechanism for the cleat or lug elements.

Fig. 5 is a view showing a scraper device for removing mud and the like from the periphery of the wheel.

Fig. 6 is a perspective view of one of the cleat or lug elements.

In the embodiment chosen for illustration of my invention, the wheel is made of metal, or other appropriate material, and comprises an outer end wall 1, a cylindrical rim 2 cast or formed integral or rigid with the wall 1, and a flange 3 integral with the inner end of the rim 2 and providing a relatively large opening 4. This wheel is rigidly attached to a rotary axle 5 driven or rotated by any appropriate driving mechanism. The axle may be made rigid with the wall 1 by driving the axle through a hole in said wall, or by sweating process, or by other known attaching means.

A cylindrical member 6 is mounted within the wheel and is attached to a disc 7 that closes the opening 4 and operates against the flange 3.

A lever 8 is mounted on a pivot 9 supported by the tractor frame 10 and has an arm 11 having pin and slot connection 12 with a bracket 13 attached to the disc 7 and engaging a rigid guide 14 supported by the tractor frame. Thus, operation of the lever 8 will move the bracket 13, the disc 7 and the cylindrical member 6 vertically. The upper end of the lever 8 has a handle 15 slidable thereon and supported by a spring 16. The lower end of the spring 16 is connected with a lug 17 rigid with the lever 8 while the upper end of said spring engages under a lateral projection 18 in connection with the lower end of the handle 15. A pin 19 projects from the handle 15 and is adapted for releasable engagement in notches 20 formed in the under side of an arm 21 rigidly supported by a bracket 22 attached to or forming part of the tractor frame.

A hub 23 is rotatively mounted on the member 6 and is formed integral or rigid with a disc portion 24 having a pair of oppositely extending flanges 25 in connection with its peripheral margin.

The rim 2 of the wheel is formed with a plurality of openings 26 in each of which a cleat or lug element 27 is mounted for inward and outward sliding movements. The inner end of each cleat or lug element 27 is formed with a slot 28 receiving the flanges 25 and with projections 29 engaging against the inner sides of the flanges 25. Thus, it is apparent that, when the lever 8 is operated to move the cylindrical member 6 vertically, the cleat or lug elements 27 will be moved in the openings 26. The relationship of these parts is such that, when the flanges 25 are concentric with the axis of the wheel rim 2, all of the cleat or lug elements are within the openings 26 and do not project beyond the peripheral surface of the rim 2, so that the rim 2 has a smooth tread and may roll along paved highways and roadways without causing damage thereto. It is also clear that, when the lever 8 is operated to move the member 6 downwardly to a position in which the flanges are eccentric with respect to the axis of the rim 2 of the wheel, the cleat or lug elements 27 will be projected through the openings 26 at the lower portion of the wheel and will be withdrawn into the wheel toward and at the top of the wheel. The cleat or lug elements 27 are loosely connected with the flanges 25, so that they will slide inwardly and outwardly without obstruction.

Each of the flanges 25 is formed with a notch 30 (Fig. 3) through which the parts 29 may be passed to engage the cleat or lug elements with the flanges 25. After all of the cleat or lug elements are connected with the flanges 25, the notches 30 may be closed by blocks 31 detachably secured to the part 24 by removable and replaceable screw fasteners 32.

A mud scraper for the wheel may be provided. As shown, the mud scraper comprises a scraper member 33 mounted on a pivot 34 supported by an arm 35 on the bracket 22 and held extended across and adjacent to the periphery of the rim 2 by a spring 36. One end of the spring 36 is connected with an arm 37 rigid with the pivot 34 and the opposite end of said spring is connected with a pin 38 attached to the scraper member 33.

The rim 2 is formed with inwardly extended flanges 39 at the sides of the openings 26 and these flanges have extended portions 40 in connection with the wall 1 and the flange 3. The flanges 39 and the extended portions 40 thereof constitute guides between which the cleat or lug elements 27 operate. The extensions 40 of the flanges 39 constitute reinforcements and braces against which the cleat or lug elements operate, so that the said elements will withstand all of the strains and stresses to which they are subjected.

It must now be apparent that this invention obtains all of its intended objects and purposes efficiently and satisfactorily and may be conveniently operated and controlled in such a way as to place the cleat or lug elements in use when it is desired to use them or to support them entirely within the wheel when they are not needed and when it is desired to operate the tractor along a paved road or highway or elsewhere in which the cleat or lug elements would cause damage. The wheel may be manufactured and sold at comparatively low cost and constructed so that it may be attached to the axles of any of the standard tractors now manufactured.

The construction, arrangement and relationship of the parts may be varied as widely as the scope of equivalent limits will permit without departure from the nature and principle of the invention. I do not restrict myself in unessential particulars, but what I claim and desire to secure by Letters Patent is:

1. A tractor wheel comprising a rim having radial openings therethrough, an outer wall rigidly attached to the outer end of said rim, a flange rigidly attached to the inner end of said rim parallel with said wall and provided with a relatively large central opening, parallel guides rigid with the inner surfaces of said wall and said flange, cleats mounted for radial movements between said guides and through said openings in said rim, a disc supported for sliding movements against the outer surface of said flange and closing said opening through said flange, a cylindrical member attached to said disc and extending to said wall, a hub mounted on said cylindrical member, a disc portion rigid with said hub, means connecting said disc portion with said cleats, mechanism for moving said disc and thereby said cylindrical member and said hub and said disc portion vertically to eccentric positions with respect to the axis of said rim, and means for holding said mechanism in its different adjusted positions.

2. A tractor wheel comprising a rim having radial openings therethrough, means for attaching said rim to a rotary axle, spaced guides rigid with said rim, cleats mounted in said guides for radial movements through said openings, a vertically movable support at the inner side of said rim, means for moving said support vertically to and holding the same in different adjusted positions, a cylindrical member attached to the outer side of said support within said rim for movement to different eccentric positions with respect to said rim, an annular device mounted on said member for vertical movements thereby, oppositely extending flanges in connection with the periphery of said annular device, and means connecting said flanges with said cleats for operating said cleats radially during rotation of the tractor wheel.

3. A tractor wheel comprising a rim having radial openings, cleats mounted for radial movements through said openings, a support mounted at the inner side of said rim for vertical movements, mechanism for moving said support to and holding said support in different vertically adjusted positions with respect to said rim, a cylindrical member attached to said support within said rim and movable by said support to different eccentric positions with respect to said rim, an annular device mounted on said member, flanges in connection with the peripheral portion of said annular device, and projections in connection with the inner ends of said cleats engaging said flanges.

4. A tractor wheel comprising a rim having radial openings therethrough, cleats mounted for radial movements through said openings, vertically movable mechanism having a part extending into said rim, means for holding said vertically movable mechanism and thereby said part in different eccentric positions with respect to said rim, and a device mounted on said part that is within said rim having permanent attachment to said cleats for moving said cleats radially inwardly and outwardly during rotation of the tractor wheel.

5. A tractor wheel comprising a rim having radial openings therethrough, an outer wall adapted to be mounted on an axle and having its peripheral portion rigid with said rim, an inwardly extended flange rigid with the inner end of said rim and spaced from said wall, cleats mounted between said wall and said flange for radial movements through said openings, vertically movable mechanism having a part extending into said rim, means for holding said vertically movable mechanism and thereby said part in different eccentric positions with respect to said rim, and a device mounted on said part that is within said rim and having permanent attachment to said cleats for moving said cleats radially inwardly and outwardly during rotation of the tractor wheel.

6. A tractor wheel comprising a rim having radial openings therethrough, an outer wall having its peripheral portion rigid with said rim, an inwardly extended flange rigid with the inner end of said rim and spaced from said wall and provided with a relatively large central opening, a vertically movable plate against said flange and closing said opening, cleats mounted for radial movements through said openings in said rim, a part attached to said plate and extending into said rim, means for moving said plate and thereby said part vertically to different eccentric positions with respect to said rim, and means operated by said part for moving said cleats radially inwardly and outwardly during rotation of the tractor wheel.

FREDERICK H. SANDHERR.